No. 834,093. PATENTED OCT. 23, 1906.
A. S. J. WEIR & T. J. HENNING.
GAS METER.
APPLICATION FILED MAY 9, 1906.
2 SHEETS—SHEET 1.
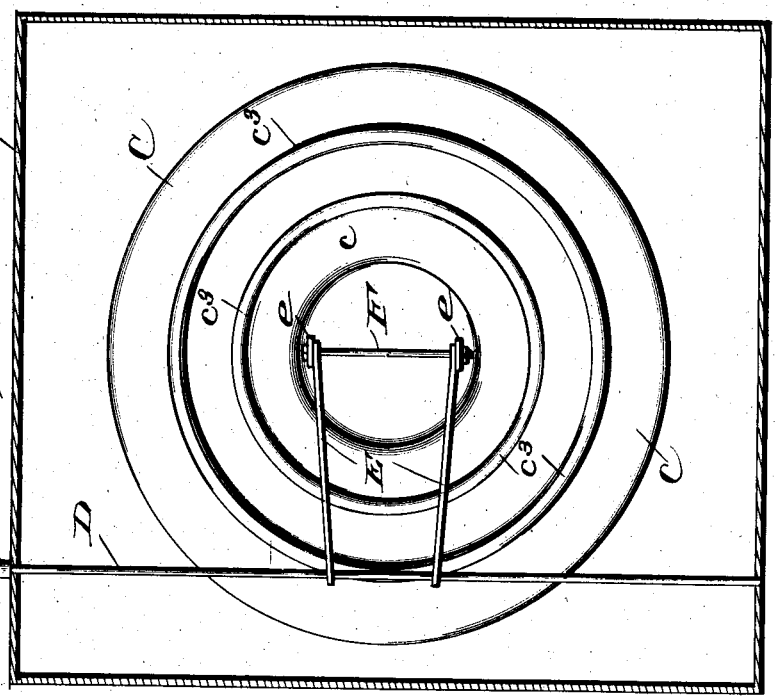
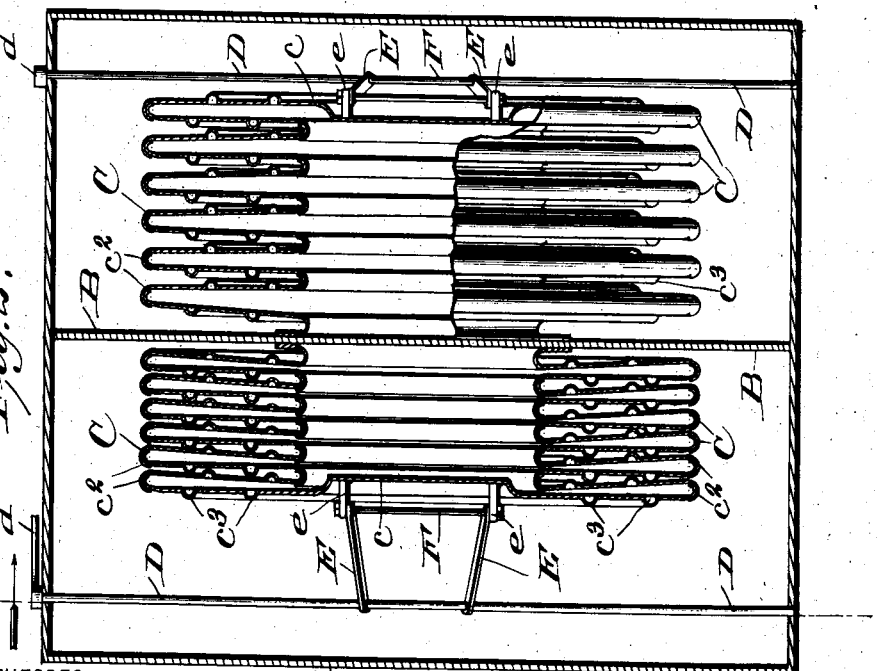
WITNESSES
INVENTORS
Albert S. J. Weir
Thomas J. Henning
BY
ATTORNEYS No. 834,093. PATENTED OCT. 23, 1906.
A. S. J. WEIR & T. J. HENNING.
GAS METER.
APPLICATION FILED MAY 9, 1906.
2 SHEETS—SHEET 2.
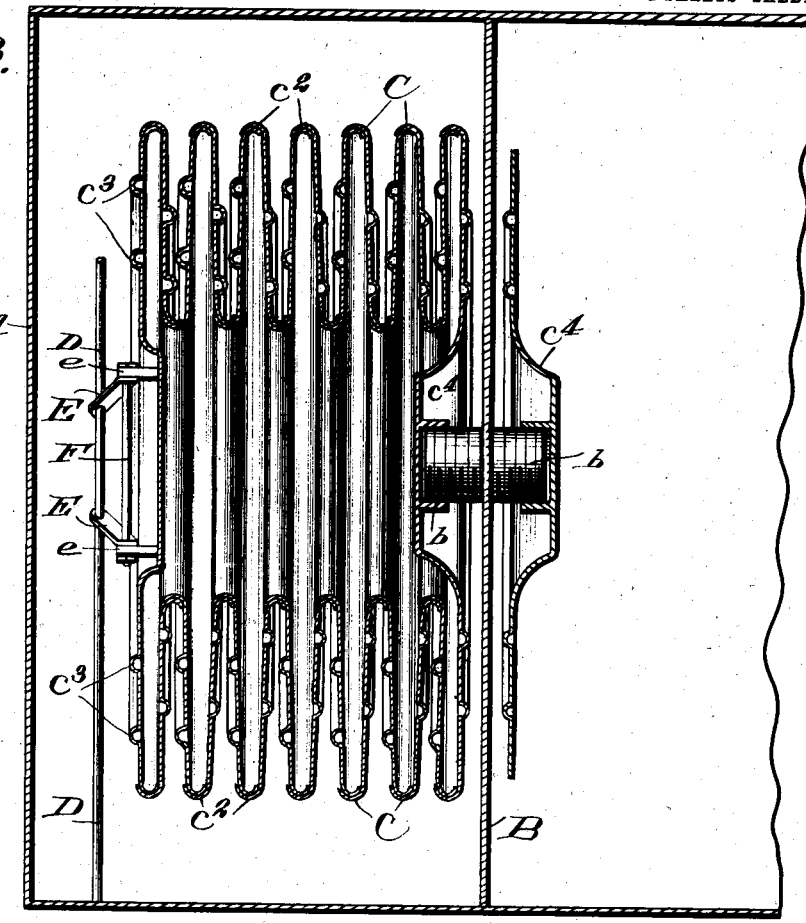
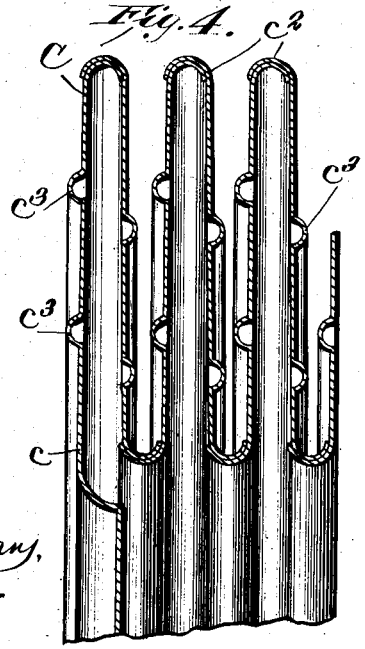
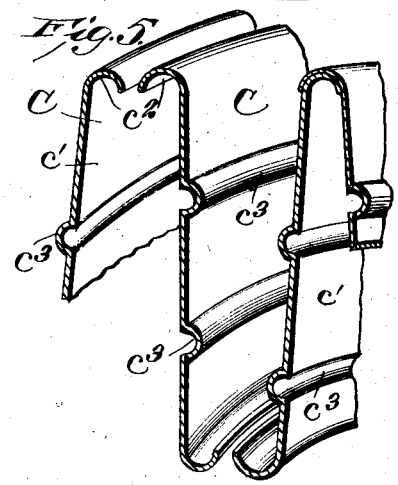
WITNESSES
INVENTORS
Albert S. J. Weir
Thomas J. Henning
BY
ATTORNEYS

UNITED STATES PATENT OFFICE.

ALBERT S. J. WEIR AND THOMAS J. HENNING, OF SAN DIEGO, CALIFORNIA.

GAS-METER.

No. 834,093.  Specification of Letters Patent.  Patented Oct. 23, 1906.

Application filed May 9, 1906. Serial No. 315,924.

*To all whom it may concern:*

Be it known that we, ALBERT S. J. WEIR and THOMAS J. HENNING, citizens of the United States, and residents of San Diego, in the county of San Diego and State of California, have invented an Improvement in Gas-Meters, of which the following is a specification.

Our invention is an improvement in the class of so-called "diaphragm" gas-meters, in which the casing or body of the meter is divided by a central vertical partition into equal compartments or chambers, each containing a bellows or expansible diaphragm adapted to alternately receive and discharge a certain volume of gas and connected with valves controlling the alternate inlet and outlet of gas and also connected with a register whereby the gas passing through the meter to the house service-pipe is accurately registered.

The invention is embodied in the construction of the bellows or diaphragm attachment as hereinafter described, and illustrated in the accompanying drawings, in which—

Figure 1 is a vertical section of a meter provided with our improved diaphragm or bellows, the plane of section being on the line 1 1 of Fig. 2. Fig. 2 is a vertical section of the meter in a plane at right angles to the section shown in Fig. 1. Fig. 3 is a vertical section of a meter provided with a bellows attachment according to our invention, the same being attached to the partition of the meter in a modified way. Fig. 4 is an enlarged sectional view of a portion of the bellows attachment. Fig. 5 is a perspective sectional view illustrating in detail the form of the circular sections of the bellows.

The box or casing A of the meter is rectangular, as usual in the class of diaphragm-meters.

B (see Figs. 1 and 3) indicates the vertical partition dividing the box or casing A into two equal compartments. In each of such compartments is arranged an expansible bellows C, and each of these is provided with means by which the valves governing the inlet and outlet of gas from the respective compartments of the meter are operated and also a registering apparatus, neither of which is shown, since they are common in the class of meters to which ours belongs. Such means comprise a flag, wire, or rod D, which is journaled in the meter-casing and provided at its upper end with a lever or crank-arm $d$, which is in practice connected with valve and registering mechanism. The rod D is connected with the bellows C by means of arms or levers E, the same being fast on the rod and pivoted upon a cross-rod F, which is arranged in lugs $e$, forming an attachment of the head $c$ of the bellows. As shown in Fig. 1, each of the bellows $c$ is soldered or otherwise secured to the partition B.

The bellows proper, C, is made of sheet-steel, and the details of construction are as follows: The aforesaid head $c$ of the bellows is formed entire or integral, and its circular edge is turned inward, as shown in Figs. 2, 3, and 4. All the remaining portion of each bellows is formed of a series of annular sections $c'$. (See especially Figs. 4 and 5.) The outer and inner edges $c^2$ of said sections are turned inward, but in opposite directions, so that they are adapted to overlap and fit upon the edges of adjacent sections, as illustrated best in Fig. 4. Such lapping portions are preferably soldered together, and thus secured gas-tight. Thus when the head $c$ and the required number of sections $c'$ are arranged and secured together, as shown in Figs. 2, 3, and 4, a metallic bellows or diaphragm is formed, and the same has the required degree of flexibility, which allows it to expand under pressure of gas and contract when relieved of such pressure. As is well understood by those familiar with the operation of this class of meters, the bellows in one compartment of the meter expands as the bellows in the other compartment contracts, the expansion and contraction being thus alternate, as shown in Fig. 2, where the left-hand bellows C is contracted and the right-hand bellows is expanded, the flag-wires D being in such case rotated, and thereby caused to operate the valve and registering mechanisms with which they are connected in practice. The joint formed at the outer edges of the heads and annular sections by the inturned overlapping portions has been found in practice to have great superiority, since it allows the said head and sections to expand and contract without sensibly affecting the security of the joint. The "life" or durability of the meter is thus correspondingly increased. It is requisite that the bellows thus formed of flexible sheet metal shall have a certain degree of resiliency and at the same time the body of the several sections $c'$ must have a certain degree of rigidity, which is obtained in part by circular corrugations $c^3$, there being preferably two in each section and the same being formed by striking up the sections in such manner that semicircular grooves are formed on the inner sides and corresponding projections on the outer sides. Thus two circular concentric ribs or corrugations $c^3$ are formed on the outer side of each section. Further, the said ribs or corrugations are so arranged that they are "staggered"—that is to say, the ribs or corrugations of adjacent sections are not arranged directly opposite each other, but are at different distances from the edges of the sections, so that when the bellows collapses, as shown in the left-hand portion of Fig. 2, the adjacent corrugations will not strike upon each other, but upon the body or plain surface of the opposite section. Thus the convolutions of the bellows are adapted to fit closer together when relieved of the pressure of gas than would be otherwise practicable.

In expansion and contraction of the bellows the ribs or corrugations prevent any snapping or crackling of the metal, which would otherwise occur. In other words, they, so to speak, "take up" and "let out," and thus facilitate expansion and contraction, so that buckling or wrinkling and popping of the metal are avoided. The corrugations hence contribute greatly to durability of the bellows.

In place of soldering the bellows C to the diaphragm B, as indicated in Fig. 2, they may be detachably connected with the partition by a screw-joint, as indicated in Fig. 3. In other words, the inner heads $c^4$ of the bellows may be provided with a screw-socket arranged centrally in the depressed portion of said heads and adapted to receive a screw-threaded tenon $b$, which is suitably attached to and projects laterally from the partition, as will be readily understood. This construction adapts the bellows to be readily detached should occasion require.

The heads and annular sections comprising the bellows may be cheaply manufactured by striking up the same in suitable dies from sheet-steel of the required quality and resiliency. The bellows is very flexible and expands and contracts with great facility, while the bodies of the several sections are rendered duly rigid by the corrugations formed therein.

We claim—

1. The improved bellows for gas-meters formed of flexible sheet metal and comprising a head having its edge inturned and a series of annular sections also having their edges curved inwardly, and alternately in opposite directions, the several edges of the head and the sections being overlapped and secured together, substantially as described.

2. The improved bellows for gas-meters, formed of flexible sheet metal, comprising a head having its edge turned inward and a series of annular sections having their edges curved in opposite directions, the several edges being fitted and soldered together and the head and sections provided with circular corrugations which are "staggered" so that when the bellows collapses the corrugations do not strike upon each other, substantially as described.

3. In a bellows for gas-meters, the combination, with a sheet-metal head having its edge inturned, and the partition of the meter, of a series of annular sections formed of flexible sheet metal and having their edges curved reversely, or in opposite directions, and secured together, the inner sections being attached to the partition and all of them provided with corrugations which are "staggered," or out of register with each other, substantially as described.

ALBERT S. J. WEIR.
THOMAS J. HENNING.

Witnesses:
C. W. WIGGINS,
ROY E. THOMPSON.